United States Patent [19]

Kvist et al.

[11] Patent Number: 4,743,279

[45] Date of Patent: May 10, 1988

[54] FILTER

[76] Inventors: Ingemar B. G. Kvist, Begoniegatan 18, S-434 00 Kungsbacka; Göran A. I. Johansson, Scheelegatan 16 D, S-416 60 Göteborg; Kaj U. I. Hönig, Ö. Förstadsgatan 19 A, S-211 31 Malmö, all of Sweden

[21] Appl. No.: 91,360

[22] Filed: Aug. 28, 1987

Related U.S. Application Data

[63] Continuation of Ser. No. 838,114, Mar. 10, 1986, abandoned.

[30] Foreign Application Priority Data

Mar. 15, 1985 [SE] Sweden ................................ 8501284

[51] Int. Cl.⁴ ................................................ B01D 53/04

[52] U.S. Cl. .................................... 55/316; 55/385 B; 98/2.11

[58] Field of Search ...................... 55/279, 316, 385 A, 55/385 B; 98/2.11

[56] References Cited

U.S. PATENT DOCUMENTS

| | | | |
|---|---|---|---|
| 2,551,923 | 5/1951 | Berge | 98/2.11 |
| 2,660,166 | 11/1953 | Coleman | 55/279 X |
| 3,457,917 | 7/1969 | Mercurio | 55/279 X |
| 3,738,621 | 6/1973 | Anderson | 98/2.11 X |
| 3,941,034 | 3/1976 | Helwig et al. | 98/2.11 |
| 4,162,289 | 7/1979 | Gomez et al. | 55/279 X |
| 4,227,446 | 10/1980 | Sone et al. | 98/2.11 |
| 4,242,951 | 1/1981 | Bemiss | 98/2.11 |
| 4,252,547 | 2/1981 | Johnson | 55/316 X |

FOREIGN PATENT DOCUMENTS

| | | |
|---|---|---|
| 2304078 | 1/1973 | Fed. Rep. of Germany . |
| 2140452 | 2/1973 | Fed. Rep. of Germany . |
| 1053285 | 12/1966 | United Kingdom . |

*Primary Examiner*—Charles Hart

*Attorney, Agent, or Firm*—Harness, Dickey & Pierce

[57] ABSTRACT

A filter for mounting on the fresh-air entrance on motor vehicles. The filter is in the form of a cartridge which is designed for mounting on the fresh-air entrance on the vehicle to cover the entrance entirely.

The filter comprises a coarse filter for separation of particles entrained in the air and a chemical action filter for chemically cleansing the air entering into the vehicle.

5 Claims, 1 Drawing Sheet

10
18
20
12
22
16
14

10
16

FILTER

This is a continuation of U.S. patent application Ser. No. 838,114, filed Mar 10, 1986, and now abandoned.

BACKGROUND OF THE INVENTION

The subject invention concerns a filter for mounting in the fresh-air entrance on motor vehicles. The filter is designed to allow it to be adjusted to various types and models of motor vehicles.

When motor vehicles are driven in heavy-traffic areas, e.g. in towns, it is inevitable that polluting particles and fumes of various kinds are entrained into the vehicle interior together with the fresh air which is carried into the car interior for ventilation purposes. The pollution is particularly extensive in town traffic and when the distance between the motor vehicles is small, which is the case in e.g. queues. The chemical pollution of the air is very concentrated and therefore particularly detrimental to the health during idling periods, for instance during standstills caused by stop lights, queue build-ups at cross-roads and the like.

Various types of air filters are available on the market which are intended to be mounted in the engine space or inside the driver and passenger compartaent. Both spaces are limited and manufacturers as well as consumers prefer alternative uses of the available space. This prior-art type of filter therefore does not enjoy extensive commercial success.

SUMMARY OF THE INVENTION

The purpose of the subject invention is to provide a filter which is designed to be mounted on the fresh-air entrance of a motor vehicle. The filter is readily mounted and installed, it is easy to adjust to various types of motor vehicles and vehicle brands and it does not occupy any space in the engine or passenger room that is preferred for other uses and purposes. These objects are achieved in accordance with the invention in a filter in the form of a cartridge which is designed to be mounted externally of the fresh-air entrance and to cover the mouths of the fresh-air entrance, said filter being characterised therein that it comprises a coarse filter for trapping the particles entrained in the air entering into the car, and also a chemical action filter which is arranged to cleanse the air from polluting gases. Further characteristics of the invention will appear from the dependent claims.

BRIEF DESCRIPTION OF THE DRAWINGS

The invention will be described in closer detail in the following with reference to the accompanying drawings, wherein.

DETAILED DESCRIPTION OF A PREFERRED EMBODIMENT

Figure 2:
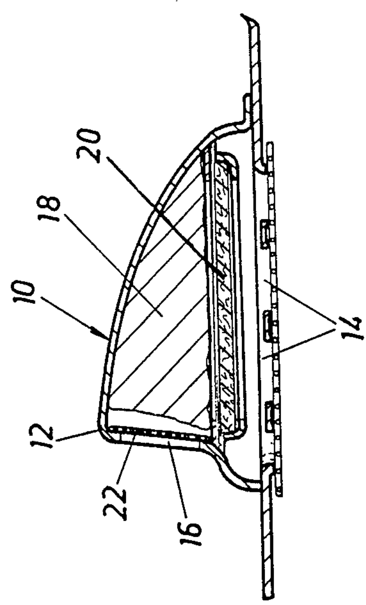
FIG. 2 is a cross-sectional view of said filter.
Figure 1:
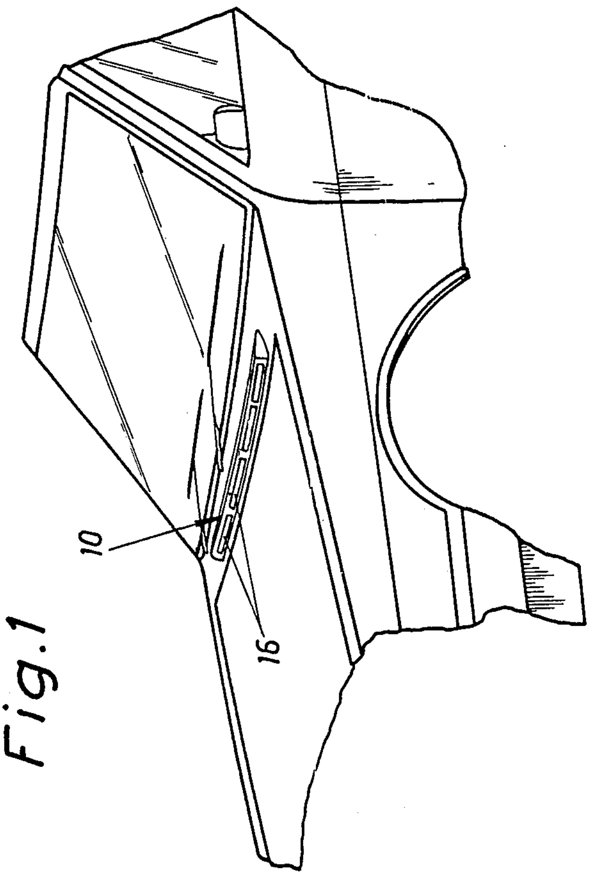
FIG. 1 is a perspective view of a motor vehicle equipped with a filter in accordance with the invention.

The filter 10 in accordance with the invention consists of an elongate cartridge 12 of plastics which is designed for mounting on the exterior of the motor vehicle, on the fresh-air entrance, in such a position that it covers the inlet mouths 14 thereof, thus ensuring that all air which is carried into the passenger space for ventilation thereof is forced to pass through the filter 10 to be filtered and cleansed. For this reason, the dimensions of the filter 10 must be adjusted to the configuration of the fresh-air entrance of the type of vehicle on which the filter is intended to be mounted. FIGS. 1 and 2 shows an "average" or general embodiment which gives a good picture of the structure of the filter. The manner in which the filter cartridge 10 may be adjusted to suit differently shaped fresh-air entrances can easily be understood from this illustration.

The filter cartridge 12 is designed to present a low resistance to air. It has the cross-sectional configuration appearing from FIG. 2. The entrance openings 16 of the filter 10 are formed in the essentially vertical front wall of the filter cartridge 12. The upper face of the filter cartridge 12 extends in a curve from the front wall (see FIG. 2) down towards the rear edge of the filter cartridge 12. Inside the filter cartridge 12 is positioned a filtering layer comprising fluff 18 for the purpose of trapping comparatively small particles, such as pollen and the like. Closest to the fresh-air entrance mouths 14 of the vehicle a chemical action filter 20 of active carbon 20 is disposed to cleance the air of chemical impurities, such as fumes and exhaust gases and the like. The filter cartridge 12 may be attached on the vehicle in any convenient manner, for instance by means of gripping or clamping members (not shown) which are arranged to be inserted into the air entrance mouths 14. It is also possible to attach the filter cartridge 12 to the vehicle in other ways, such as by screw fasteners, glue or rivets.

In order to protect the filter layer 18 a grill 22 or similar means preferably is provided across the cartridge openings 16 in order to prevent larger particles, for instance leaves, pine needles, insects and the like from entering the filter cartridge 12.

By mounting the filter cartridge 12 externally on the vehicle no space inside the engine room or the passenger compartment needs to be made use of.

The embodiment of the invention described in the aforegoing is to be regarded as one example only and a variety of other modifications are possible within the scope of the appended claims. The filter cartridge 12 is easy to adapt to use on any desired vehicle model, as basically the cartridge 12 need only be configured to cover the mouths 14 of the fresh-air entrance.

What we claim is:

1. An improved filter designed to be mounted on existing motor vehicles on the normally open fresh air entrance thereof, said filter being constructed as a cartridge for external mounting on said fresh air entrance so as to cover the openings thereof, said cartridge comprising an outer housing defining an outlet for convering the openings of the vehicle fresh air entrance, an inlet opening and a filter chamber between said inlet opening and said outlet and said cartridge permanently containing a coarse filter designed to trap particles in the air entering into said motor vehicle, and a chemical action filter arranged to cleanse said air from pollution gases.

2. An improved filter as claimed in claim 1, comprising a grill positioned across the inlet opening of said cartridge outer housing to separate larger particles, such as leaves, from the entering air.

3. An improved filter as claimed in claim 1, wherein said coarse filter is a pollen filter designed to trap smaller articles entrained in the incoming air.

4. An improved filter as claimed in claim 3, wherein said pollen filter is made from fluff.

5. An improved filter as claimed in claim 1, wherein said chemical action filter consists of active carbon.

* * * * *